United States Patent
Takeuchi et al.

[11] Patent Number: 5,951,938
[45] Date of Patent: *Sep. 14, 1999

[54] PROCESS FOR INJECTION STRETCH BLOW MOLDING

[75] Inventors: Setsuyuki Takeuchi; Nobukuni Ibe, both of Nagano-ken, Japan

[73] Assignee: A.K. Technical Laboratory, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/721,697

[22] Filed: Sep. 26, 1996

[30] Foreign Application Priority Data

Sep. 29, 1995 [JP] Japan ................................ 7-276774

[51] Int. Cl.⁶ ................................................ B29C 49/08
[52] U.S. Cl. ...................................... 264/520; 264/532
[58] Field of Search ...................................... 264/520, 532

[56] References Cited

U.S. PATENT DOCUMENTS

| | | |
|---|---|---|
| 4,235,837 | 11/1980 | Noonan . |
| 5,364,585 | 11/1994 | Takeuchi ................................ 264/520 |
| 5,620,650 | 4/1997 | Nakajima et al. ................ 264/520 |
| 5,679,306 | 10/1997 | Nakajima et al. ................ 264/520 |

FOREIGN PATENT DOCUMENTS

| | | |
|---|---|---|
| 106922 A1 | 10/1982 | European Pat. Off. . |
| 454997 A2 | 3/1991 | European Pat. Off. . |
| 0454997 | 11/1991 | European Pat. Off. . |
| 501738 A2 | 2/1992 | European Pat. Off. . |
| 53-047457 | 4/1978 | Japan ................................ 264/520 |

*Primary Examiner*—Catherine Timm
*Attorney, Agent, or Firm*—Ostrolenk, Faber, Gerb & Soffen, LLP

[57] ABSTRACT

An improved method for injection stretch blowing is provided. In the process, a molten resin is injected into an injection cavity defined by an injection mold, a lip mold and an injection core to form a desired preform, the cooling time for this preform being positively reduced to form a rigid skin layer on the outer surface of the preform without increasing the thickness. It is then released from the injection mold and transferred into the blow mold with a mouth portion being held with the lip mold while the skin layer keeps the configuration of the preform and the interior is in a high temperature state, and is stretch blow molded into a hollow molded article, e.g. a bottle whose major portion is ultrathin, at the moment when the surface temperature of the preform that rises due to its own interior temperature is significantly higher than a glass transition temperature (Tg) and is expected to reach to a peak temperature. Thereby, it is possible to allow molding of a hollow molded article having a thickness of 0.17 mm or smaller without being affected by limitations of thickness of the preform and molding temperature even in a molding process where the preform is released from the mold at a high temperature and is then immediately subjected to stretch blow molding.

2 Claims, 2 Drawing Sheets

PROCESS FOR INJECTION STRETCH BLOW MOLDING

BACKGROUND OF THE INVENTION

1. Field of the Invention

This invention relates to a molding process for continuously carrying out injection molding of a preform formed of a synthetic resin and stretch blow molding into a hollow molded article of which major portion such as a body portion is ultra-thin.

2. Background Art

As one of molding processes referred typically to as injection stretch blow molding, there is the process that comprises holding an injection molded preform at a mouth portion thereof with a lip mold and transferring it immediately to a blow mold to carry out stretch blow molding.

A 3-station type molding process described in Japanese Patent Laid-open Publication No. 4-214322 or European Patent Publication No.454997A1 comprises injecting a molten resin into an injection cavity to form a desired preform, releasing the preform from the injection mold with a mouth portion thereof being held with a lip mold while it is in a state where a skin layer generated on the surface of the preform as a result of quick cooling enables one to keep the configuration and at a high temperature state where interior cooling is not completed, transferring it from the injection mold to the blow mold by using the lip mold as it is, and stretch blow molding the preform into a thin hollow molded article in a time duration before the surface temperature of the preform that rises due to its own interior heat reaches a peak temperature.

This molding process is remarkably effective to stretch blow mold a molded article such as a bottle comprising a body portion having an average thickness of 0.2~0.35 mm, but is considered to cause trouble to stretch blow mold an ultra-thin molded article (having a 0.15 mm or thinner body portion) at a higher stretching ratio.

A thick and short preform is used for the stretch blow molding of a molded article that requires a high stretching ratio. However, when using polyethylene terephthalate or the like, it takes time to cool the preform through the injection mold when the preform has a larger thickness and crystallization of the preform causes whitening. In cases of a cold parison technique in which a preform cooled to a room temperature is re-heated for the stretch blow molding or a temperature controlling technique in which a preform at a high temperature is further heated to control the temperature thereof before the stretch blow molding, this crystallization does not particularly cause a problem because the heating is immediately before the stretch blowing, so that the thickness may be determined up to 4.0 mm. However, in a process where the preform released from the mold at a high temperature is immediately subjected to the stretch blow molding, the thickness is limited to 3.0 mm due to great influence of the crystallization. It is therefore extremely difficult to increase the stretching ratio for a thick short preform.

Furthermore, in the process where the preform released from the mold at a high temperature is immediately subjected to the stretch blow molding, the molding temperature is lower than that in the molding processes using the cold parison technique or temperature controlling technique because the stretch blow molding is carried out with the surface temperature of the preform being increased by its own interior heat to higher than the glass transition temperature (Tg), and just when the preform is stretch blow molded, the temperature of the preform decreases rapidly due to the increase in surface area as a result of stretch expansion. Accordingly, thickness deviation or crazing tends to occur to form a bad shape when the stretching ratio is such that the temperature in the last phase of the stretch expansion is significantly lower than the glass transition temperature.

This molding temperature may be 95° C. or higher by means of reducing the cooling time to control the surface temperature immediately after the releasing from the mold to 70° C. or higher. Nevertheless the peak temperature does not reach 100° C. The quantity of internal heat is insufficient at 100° C. or lower and is not enough to stretch and expand the preform by 13 times or more.

It is considered in stretch blow molding that the thickness of the major portion of, for example, a bottle can be reduced by means of increasing the stretching ratio depending on the thickness and the temperature of the injection molded preform. This reduction in thickness is greatly useful for savings in materials and reduction of wastes and the effects thereof are great both in economically and socially terms. The thickness reduction greatly deteriorates the buckling strength and thus there is a limitation of use as a single body, but it may be developed as a novel packaging container when combined with a paper container or the like. On the other hand, it is difficult, in the molding process in which the injection molded preform is immediately subjected to the stretch blow molding, to increase the stretching ratio to form the bottle to have an ultra-thin major portion because of the combination of the above mentioned limitation on the thickness of the preform and the molding temperature.

Therefore, an object of this invention is to provide a novel process for injection stretch blow molding that allows production of hollow molded articles having a thickness so ultra-thin that it can be folded, without increasing the thickness of the preform beyond that of conventional ones, even in the process in which the preform released from the mold at a high temperature is immediately subjected to the stretch blow molding.

SUMMARY OF THE INVENTION

It has been found that the thickness for possible easy manual folding is 0.15 mm or smaller in hollow molded articles such as bottles of which the molding material is polyethylene terephthalate and that the molding of the above mentioned ultra-thin bottle can be made when the surface temperature of the preform during the stretch blow molding is 105° C. or higher, even in the preform which is released from the mold at a high temperature and of whose thickness is limited. However, it has also been revealed that use in the high temperature region of 105° C. or higher is possible only in specific conditions.

In this invention "ultra-thin" represents a thickness of 0.15 mm or smaller in comparison with the thickness (about 0.25~0.35 mm) of a body portion of commercially available PET bottles.

Therefore, an object of the present invention is to provide a process for injection stretch blow molding comprising the steps of injecting a molten resin into an injection cavity defined by an injection mold, a lip mold and an injection core to form a desired preform; forming a rigid skin layer on an outer surface of the preform without increasing the thickness thereof, by means of positively reducing the cooling time for the preform; releasing it from the injection mold with a mouth portion being held with the lip mold while the skin layer keeps the configuration of the preform and the interior is in a high temperature state; transferring it to a blow mold; and stretch blow molding it into a hollow molded article of which the major portion is ultra-thin at the moment when the surface temperature of the preform that rises due to its own interior heat is significantly higher than a glass transition temperature (Tg) and is expected to reach to a peak temperature.

Especially, the stretch blow molding is carried out at the moment when the surface temperature of the preform rising due to its own interior heat is at least 20° C. or more higher than its glass transition temperature.

In addition, this invention is directed to force a gas of a desired pressure into a boundary between the preform in a molten state and an injection core after the molten resin is completely injected into the injection cavity to separate the inner surface of the preform from the surface of the injection core by using gas pressure so as to press the preform against the surface of the injection mold to positively quick cool the outer surface of the preform.

Furthermore, in this invention releasing of the preform formed of polyethylene terephthalate from the injection mold is carried out in a temperature range where the surface temperature of the preform immediately after the releasing from the mold is around 70° C., and stretch blow molded into the hollow molded article of which the major portion is ultra-thin with a thickness of 0.07~0.15 mm at the moment when a peak temperature is expected to be reached while the surface temperature of the preform that rises due to its own interior heat is in a high temperature region of 105° C. or higher.

DETAILED DESCRIPTION OF THE PREFERRED EMBODIMENTS

Figure 1:
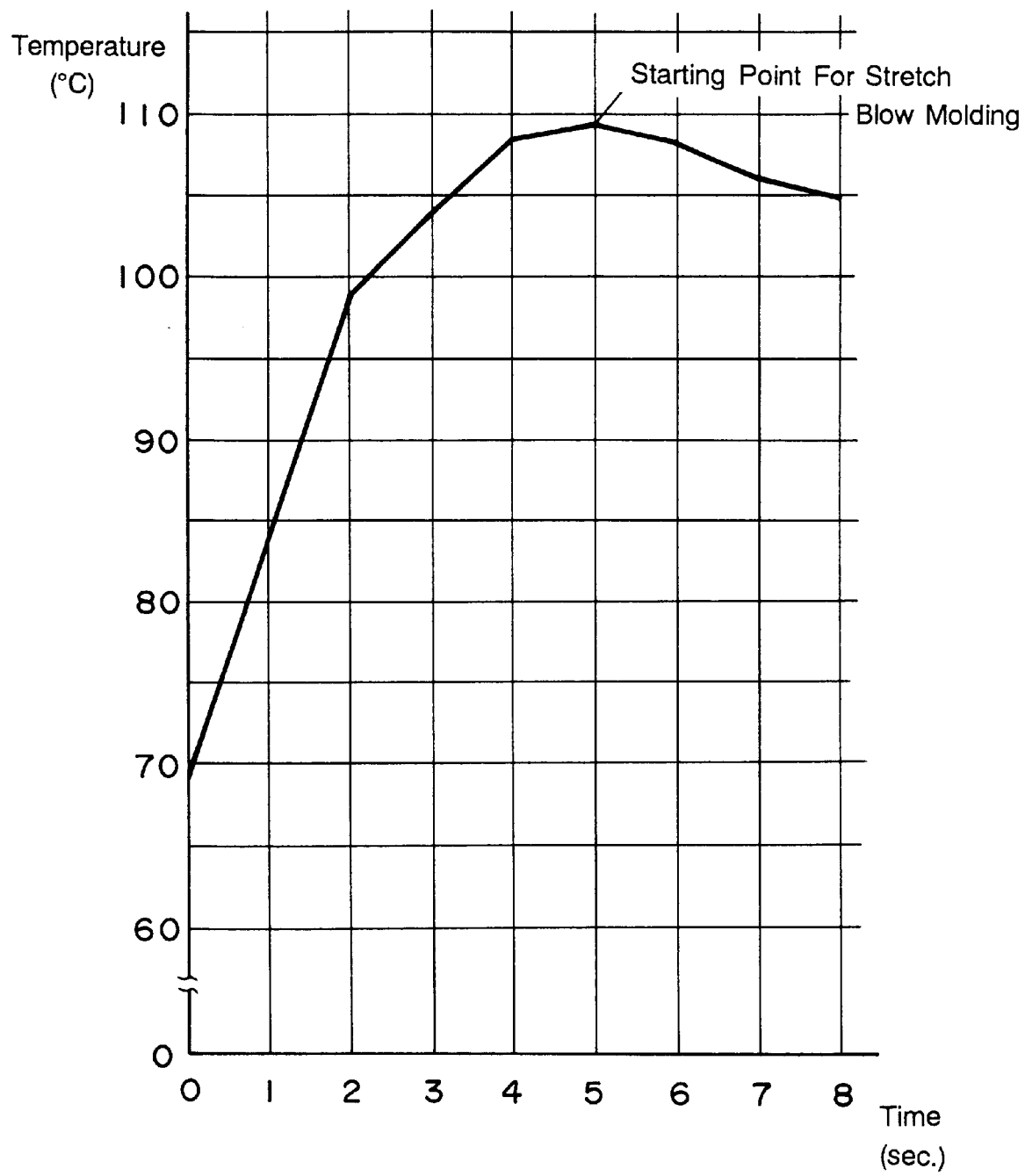
FIG. 1 is a graph of time and temperature of the outer surface of a preform that is injection molded using polyethylene terephthalate after releasing from the mold at a high temperature.

First, the temperature of an injection mold is set such that the temperature of an upper portion thereof is the lowest and the temperature of a lower portion thereof is lower than that of an intermediate portion thereof. The injection mold in this controlled and fixed state and a lip mold are closed. Furthermore, an injection core whose temperature is set to be slightly higher than that of the injection mold is inserted into the injection mold from upward of the lip mold to form an injection cavity.

After closing the mold, polyethylene terephthalate in the molten state is injected into the above mentioned injection cavity cooled to 13~17° C. through the bottom thereof from a nozzle to form a preform having a shape of a bottomed cylinder with a portion to be stretched having a thickness of 2.5~3.0 mm on average except for the neck portion and the bottom portion and with the portion to be stretched having a height of around 90 mm. Compression air is forced at a pressure of around 8 kg/cm$^2$ through the tip or from the side of the neck of the injection core immediately after the injection-filling is completed and the dwelling is started or during the dwelling.

For the preform in the injection mold immediately after the beginning of the dwelling, cooling of the thin neck portion and bottom portion precedes because of the thickness. The inner and outer surfaces contacting with the surface of the injection mold and the surface of the injection core start to form a skin layer due to the cooling. The internal portion is still in a high temperature state and is in a molten or semi-molten state. Accordingly, the preform is entirely in a soft state and is not completed to withstand an external pressure. The air thus enters a boundary between the preform along the injection core, pushing said preform aside.

As a result, the inner surface from the neck portion to the bottom portion of the preform that are cooled and solidified is separated from the surface of the injection core whereby a separation is generated. In addition, the preform is pressed against the surface of the injection mold because of the pressure of the air forced into the boundary between the injection core and the preform. The air in the boundary exists as a separation layer until the supply thereof is stopped. This causes the inner surface of the preform be separated from the surface of the injection core and the outer surface of the preform to be kept in close contact with the surface of the injection mold, which is the contrary to typical injection molding. Therefore, the cooling of the outer surface goes on positively and a desired skin layer is formed in a cooling time of within 3 sec., though depending on the thickness.

The skin layer of formed on the outer surface of the preform by this positive cooling becomes rigid. With the continuous cooling, the skin layer extends to the inner portion of the preform to increase the thickness and decrease the quantity of internal heat. The forcing of the air is stopped and the preform is released from the mold when the skin layer on the outer surface reaches the state which keeps the shape of the preform. This releasing from the mold is thus carried out at the same time as the cooling is stopped. In addition, the releasing from the mold precedes ejection of the injection core. Subsequently it is carried out by ejecting the preform from the injection mold by means of the above mentioned lip mold used to form the neck portion of the preform.

Though the surface temperature of the preform immediately after releasing from the mold is equal to or lower than the glass transition temperature (around 70° C.) because it is caused to be rigid by the quick cooling, the surface temperature rises in a short time as indicated in FIG. 1 because the interior temperature thereof is high. The preform is transferred to the blow mold with the neck portion being held by the lip mold before the peak temperature is reached. The preform is stretched in an axial direction using a stretching rod and air blowing is carried out to stretch and expand to 14 times or more at the time when the peak temperature (109° C.) of the surface of the preform is expected to be reached.

Figure 2:
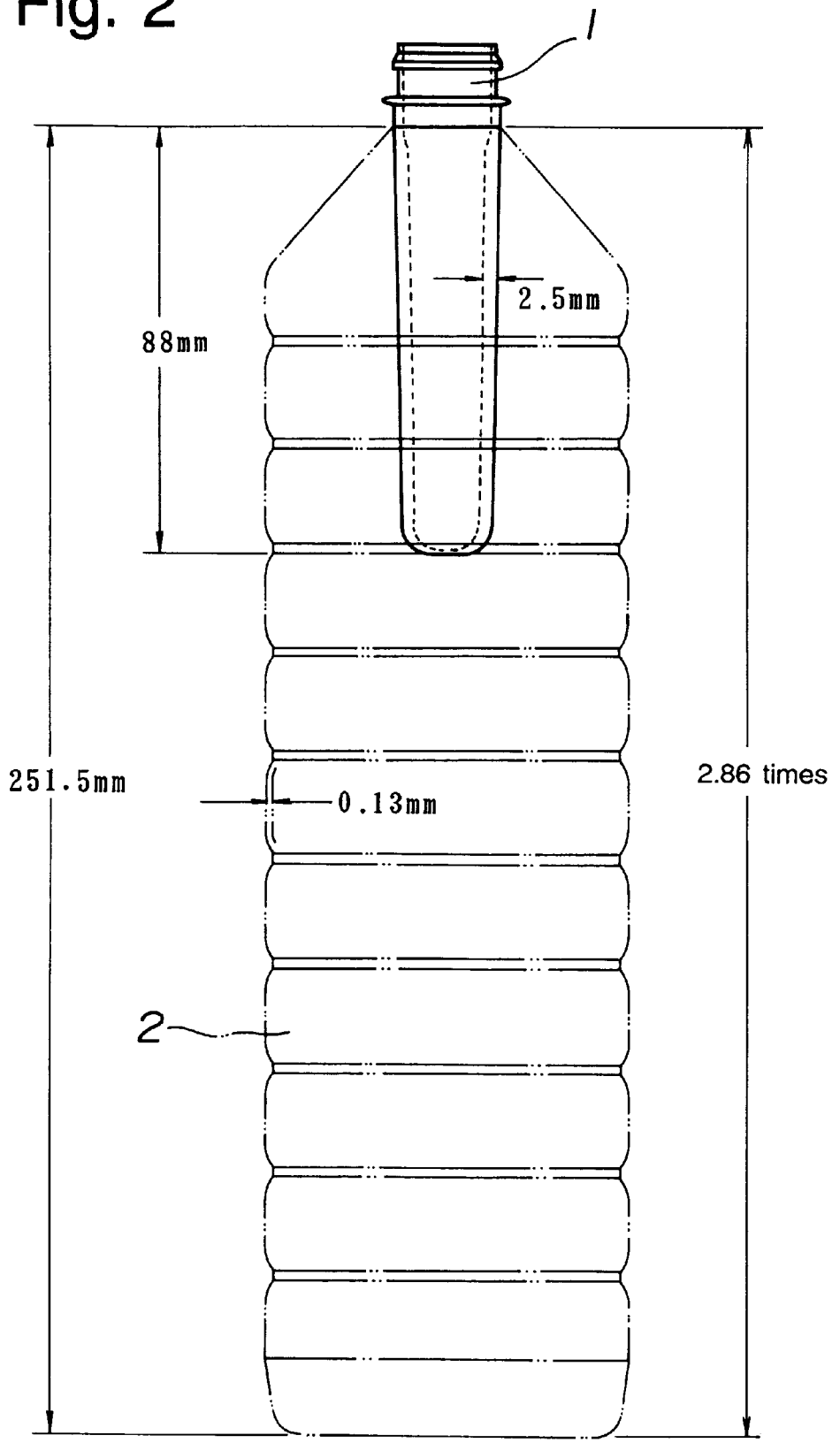
FIG. 2 is a view for use in describing a preform and a bottle that is stretch blow molded.

The beginning of this stretch expansion is carried out in a state where the internal portion at a high temperature is encapsulated by the skin layers on the inner and outer surfaces, and no molecular orientation is expected at that stage. The surface area increases and the thickness is reduced accompanying the stretch expansion, so that the temperature of the preform becomes close to the glass transition temperature because it is rapidly cooled in the process of the stretch expansion as discussed before. As a result, the stretch expansion in the last stage is carried out near the glass transition temperature region, and thus it is entirely molecular oriented even if the temperature at the beginning of the molding is as high as 105° C. or higher. In addition, the stretch proceeds from where the temperature is low to where it is high for polyethylene terephthalate even with only a slight temperature difference. Therefore, it is stretched and expanded without causing thickness deviation even at a high stretch expansion magnification. A preform 1 is thus formed into a strong and ultra-thin bottle 2 having a thickness of around 0.13 mm as shown in FIG. 2.

This bottle 2 is molded such that the thickness of the bottom portion is thin although not as thin as the body portion, so that it can easily be deformed into a flat shape except for the neck portion and can easily be restored to the original shape when the air is blown thereinto. Furthermore, it can easily be folded or rolled, so that it can be folded compact for transportation.

[Embodiment]

| | |
|---|---|
| Molding Material: | polyethylene terephthalate (product No. 9921W available from Eastman Kodak Company) |
| Preform Size | |
| 1. Height (mm): | Neck Portion 10.8 |
| | Stretched Portion 88.0 |
| 2. Outer Diameter of | Neck Portion 19.0 |
| Flat Cross-section (mm): | Stretched Portion 18.9 |
| 3. Thickness (mm): | Neck Portion 1.0 |
| | Stretched Portion 2.5 |
| 4. Range of Thickness of | 2.6 (neck portion side) to |
| Portion to be stretched (mm): | 1.8 (bottom side) |
| Product Size | |
| 1. Volume: | 1028 cc |
| 2. Shape: | Rectangular Bottle |
| 3. Height (mm): | Neck Portion 16.0 |
| | Body Portion 251.5 |
| 4. Outer Diameter of | Neck Portion 19.0 |
| Flat Cross-section (mm): | Body Portion 70 (corner) |
| 5. Thickness (mm): | Neck Portion 1.0 |
| | Body Portion 0.13 |
| 6. Stretching Ratio (axial direction): | 2.86 times |
| Area Ratio: | 19.2 times |
| Preform Molding Conditions | |
| Barrel Temperature (average): | 280° C. |
| Mold Temperature (measured value): | Cavity 16.8° C. |
| | Core 17.5° C. |
| Injection Filling Time: | 3.3 sec. |
| Air Pressure upon Releasing from Mold: | 8 kg/cm$^2$ |
| Cooling Time (after Dwelling): | 2.4 sec. |
| Stretch Blow Molding Conditions | |
| Preform Temperature upon Releasing from Mold: | 68° C |
| Peak Temperature: | 109° C. |
| Peak Time (after Releaslng from Mold): | 5 sec. |
| Preform Temperature upon Stretch Blowing: | 109° C |
| Time from Releasing from Mold to Blow Molding: | 5 sec. |
| Blow Air Pressure (kg/cm$^2$): | Primary Pressure 5, |
| | Secondary Pressure 26 |
| Blow Mold Temperature | Ordinary Temperature |

What is claimed is:

1. A process for injection stretch blow molding, comprising the steps of:

injecting a molten polyethylene terephthalate resin into an injection cavity defined by an injection mold, a lip mold, and an injection core to form a desired preform;

forming a rigid skin layer on an outer surface of the preform by forcing a pressurized gas into a boundary between the preform in a molten state and the injection core immediately after the beginning of dwelling to separate the inner surface of the preform from the surface of the injection core and to press the preform against a surface of the injection mold to positively quickly cool the outer surface of the preform;

releasing the preform from the injection mold and the injection core in a temperature range so that the surface temperature of the preform immediately after the releasing from the mold is around 70° C. with a mouth portion of the preform held by the lip mold while the skin layer of the preform keeps the configuration of the preform and the interior of the preform is in a semi molten state;

transferring the preform to a blow mold; and stretch blow molding the preform into a hollow molded article having at least a portion thereof being ultra-thin with a thickness of 0.07–0.15 mm, said stretch blow molding being performed at a time when the outer surface of the preform is expected to reach a peak temperature and when the temperature of said outer surface of the preform, which rises due to its own interior heat, is 105° C. or higher.

2. The process for injection stretch blow molding as claimed in claim 1, wherein the stretch blow molding has an expansion ratio of at least 14.

\* \* \* \* \*